April 8, 1952 — A. E. M. MITCHELL — 2,591,850
BEDPAN
Filed June 23, 1950
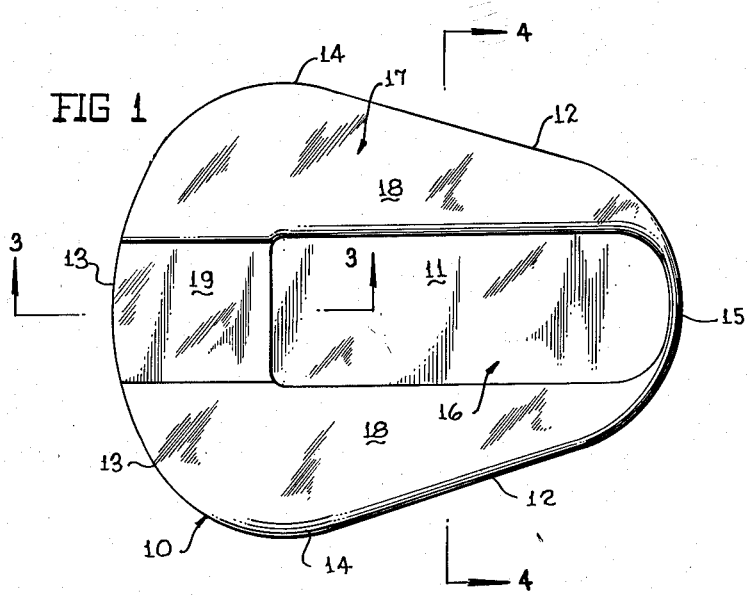
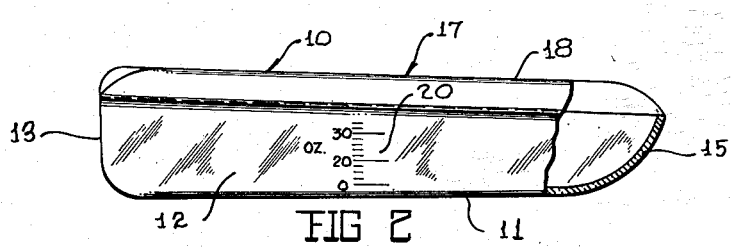
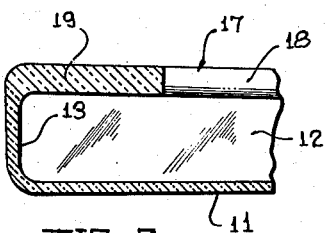
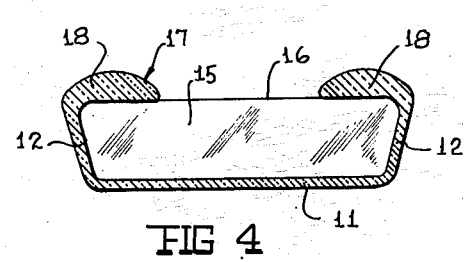
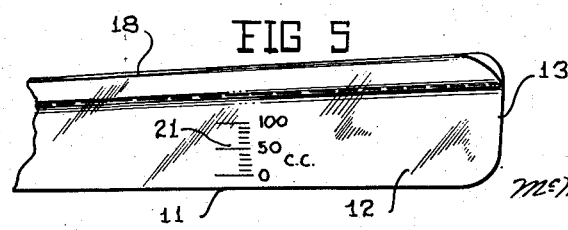
INVENTOR.
AMELIA E. M. MITCHELL
BY
McMorrow, Berman & Davidson
ATTORNEYS Patented Apr. 8, 1952

2,591,850

UNITED STATES PATENT OFFICE 2,591,850

BEDPAN

Amelia E. M. Mitchell, Ponchatoula, La.

Application June 23, 1950, Serial No. 169,905

1 Claim. (Cl. 4—112)

My invention relates to improvements in bedpans.

A primary object of the invention is to provide a bedpan of transparent, substantially unbreakable material, the bedpan having fluid content measuring means.

A further object is to provide a bedpan for use in hospitals and in the home, the top of the pan being shaped in a manner similar to conventional toilet seats, the pan being comfortable for the patient using it, whether he is lying in bed or in a sitting position.

A further object is to provide a one-piece or unitary bedpan formed of unbreakable glass or the like and designed so that the contents thereof will have no tendency to spill, the bedpan having means, however, to facilitate pouring out or emptying the contents.

A still further object of the invention is to provide an improved bedpan which is highly simplified, very easy to clean and therefore highly sanitary, and quite inexpensive to manufacture.

Other objects and advantages of the invention will be apparent during the course of the following description.

In the accompanying drawings forming a part of this application, and in which like numerals are employed to designate like parts throughout the same:

Figure 1 is a plan view of a bedpan embodying my invention;

Figure 2 is a side elevational view of the same;

Figure 3 is a central, vertical, longitudinal, sectional view taken on line 3—3 of Figure 1;

Figure 4 is a transverse, vertical, sectional view taken on line 4—4 of Figure 1; and Figure 5 is a fragmentary side elevational view of the side of the bedpan opposite to that shown in Figure 2.

In the drawings, where, for the purpose of illustration, is shown a preferred embodiment of my invention, the numeral 10 designates generally my unitary improved bedpan, preferably formed of clear or transparent, tempered or unbreakable glass. If desired, the bedpan 10 may also be formed of any other suitable material, such as a transparent glass laminate.

As viewed in plan, the bedpan 10 is somewhat elongated, and preferably tapered longitudinally toward its forward end. It comprises a wide, flat bottom 11 and straight, forwardly converging, low, upstanding side walls 12 which diverge or flare upwardly slightly, Figure 4. The side walls 12 are integrally secured to the flat bottom 11, as shown, and the bedpan further comprises a rear, extending vertical end wall 13 which is transversely curved, as shown in Figure 1. The rear end wall 13 blends smoothly into the straight, converging side walls 12 at the widest portion of the bedpan, as shown at 14, and near and forwardly of the rear end of the bedpan.

The bedpan further comprises an upwardly curved, relatively narrow forward end wall 15 which is also curved or rounded transversely of the bedpan, as shown in Figure 1. The forward end wall 15 slopes upwardly and forwardly in such a manner that it constitutes a convenient pouring means or spout to facilitate emptying the contents of the bedpan.

The bedpan 10 has substantially the same depth throughout its full width and length, although the top of the pan may slope downwardly very slightly toward its forward end, Figure 2. The bedpan 10 is provided in its top with a relatively narrow, longitudinally elongated, parallel sided opening 16 extending rearwardly throughout the major portion of the length of the bedpan from the forward or pouring end 15. The rear end of the opening 16 is disposed substantially adjacent to the widest point 14 of the pan, Figure 1.

The bedpan includes an integral, substantially horizontal top wall 17 surrounding the opposite longitudinal sides and rear transverse end of the opening 16. This top wall 17 forms an important feature of my invention, and includes a pair of laterally spaced, longitudinal top sections 18, extending for substantially the entire length of the bedpan. The top sections 18 are built up or thickened so that they are preferably about one inch thick at their transverse centers, and the top faces of the sections 18 are transversely rounded, Figure 4, so that they have shapes in transverse cross-section very similar to those of the sides of a conventional toilet seat. As shown in Figure 1, the top sections 18 taper longitudinally forwardly, and are much narrower at the forward end of the bedpan than at the rear portion thereof. The top 17 further comprises a rear, central, flat, substantially horizontal portion or section 19, integrally connected with the side sections 18 and being of the same thickness as the side sections 18 at their points of maximum thickness. The top face of the rear, central section 19, however, is not rounded like the top faces of the side sections 18, but is formed plane or flat, as shown. The side sections 18 and the rear section 19 of the substantially horizontal top 17 all project laterally inwardly of the marginal edge of the bedpan 10, so that they are arranged in vertically spaced, superposed relation with respect to the flat bottom 11. This arrangement renders it very unlikely that the contents of the bedpan will be accidentally spilled. The bedpan 10 contains no external or internal, sharp corners or edges, and all corners and edges are smoothly rounded, as shown, for the sake of comfort and to facilitate cleaning and sterilizing the bedpan. The length and width of the opening 16 are such that the bedpan is adapted to be used comfortably by adults and children.

To facilitate measuring the fluid content of the bedpan, without transferring the same to a separate measuring receptacle, I provide a pair of measuring scales 20 and 21 upon the opposite sides 12 of the bedpan. These scales extend vertically, as shown, and are marked upon the sides 12 in any conventional manner so as to be clearly visible. The measuring scale 20 is preferably graduated in ounces, while the other scale 21 is graduated in cubic centimeters. The scales 20 and 21 are very useful, since it is often important in hospitals and the like to measure the contents of the bedpan. Further, since the bedpan is transparent, the color and other physical properties of the contents may be readily observed without transferring them to another receptacle. The transparency of the bedpan facilitates detecting foreign objects in the stool, such as coins and the like, often swallowed by children. It is also easy to see Murphy buttons, given after certain operations, and passed in the stool to evidence the success of the operation. Obviously, there are many other important advantages in having the bedpan transparent. Patients receiving radio isotopes cannot use metal bedpans and therefore have to be carried or walked to commode.

When a patient is in a sitting position, the top 17 is used like a conventional toilet seat. When the patient is prone or lying in bed, the buttocks engage the side sections 18 of the top 17, while the small of the back engages or rests upon the rear, central, flat section 19. Accordingly, the bedpan is designed for the comfort of the patient, whether he is sitting up or prone.

It is to be understood that the form of the invention herewith shown and described is to be taken as a preferred example of the same, and that various changes in shape, size and arrangement of parts may be resorted to without departing from the spirit of the invention or the scope of the subjoined claim.

Having thus described my invention, I claim:

In a bedpan having a longitudinally elongated flat bottom and a peripheral wall thereon including straight side walls converging toward one end of the bedpan, and transversely curved wide and narrow end walls joining the opposite ends of the side walls, a top wall on the upper edges of said side and end walls, said top wall comprising longitudinally elongated side sections laterally spaced from each other throughout their length forming a relatively narrow longitudinally elongated opening therebetween, said opening extending longitudinally from the narrow end wall toward the wider end wall, said top wall including another section positioned between said side sections and said wider end wall at one end of said opening, the upper surfaces of said side sections being transversely and convexly curved throughout their length and the upper surface of said other section being flat and plane throughout its length and width.

AMELIA E. M. MITCHELL.

REFERENCES CITED

The following references are of record in the file of this patent:

UNITED STATES PATENTS

| Number | Name | Date |
|---|---|---|
| 805,312 | Meinecke | Nov. 21, 1905 |
| 870,984 | Meinecke et al. | Nov. 12, 1907 |
| 2,188,844 | Pedersen | Jan. 30, 1940 |
| 2,243,791 | Botenstein | May 27, 1941 |